Patented Oct. 29, 1946

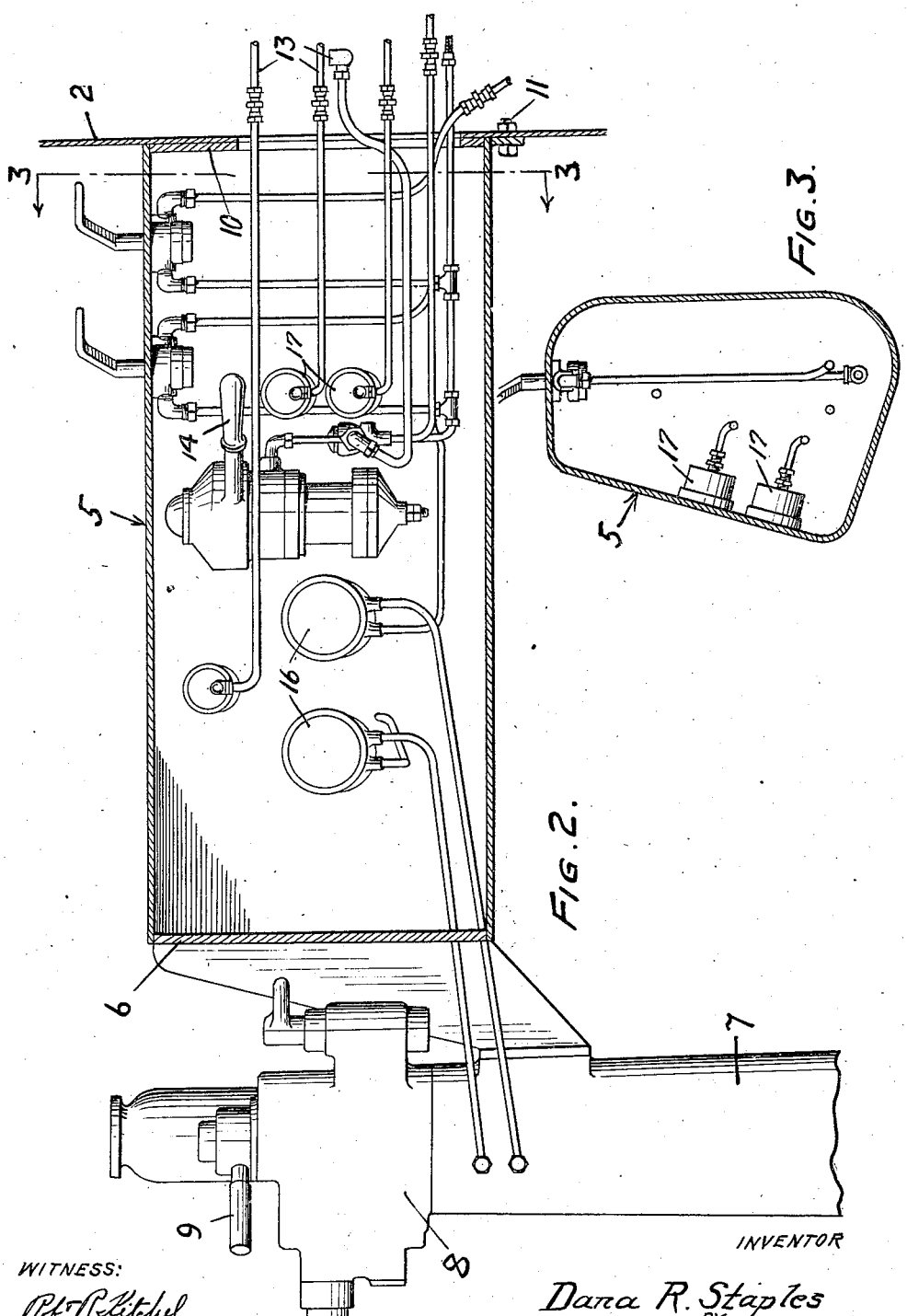

2,410,250

UNITED STATES PATENT OFFICE 2,410,250

LOCOMOTIVE CONTROL PANEL

Dana R. Staples, Ridley Park, Pa., assignor to The Baldwin Locomotive Works, a corporation of Pennsylvania Application March 22, 1944, Serial No. 527,590

5 Claims. (Cl. 105—35)

This invention relates generally to control equipment for locomotives and more particularly to control panels for Diesel electric locomotives.

Heretofore various control devices for the engine, electrical equipment, air brakes and many other accessories have been mounted and arranged in such a way as to be excessively costly in construction or assembly or to require an excessive amount of space as well as involving inconvenience in operation of the controls and other complications in the cab, it being understood that space in a cab is at a premium and simplicity and convenience of operation of the controls are highly desirable not only from the standpoint of safety of operation but for the comfort of the engineer to minimize fatigue and other factors which contribute to accidents.

It is an object of my invention to provide an improved control panel that not only has a high degree of simplicity in its construction and operation but is highly compact and is adapted to be readily assembled in its normal position in such a way that the multitude of usual pipe and electrical connections can be easily and quickly made between the control panel and the various devices controlled from the panel.

Another object is to provide an improved control panel having the foregoing as well as other characteristics in addition to being rigidly supported and allowing ample foot and leg room for the engineer.

Other objects and advantages will be more apparent to those skilled in the art from the following description of the accompanying drawings in which:

Fig. 2 is a side elevation of the control box partly in section to show connections through the cab wall; and Fig. 3 is a section on line 3—3 of Fig. 2.

Figure 1:
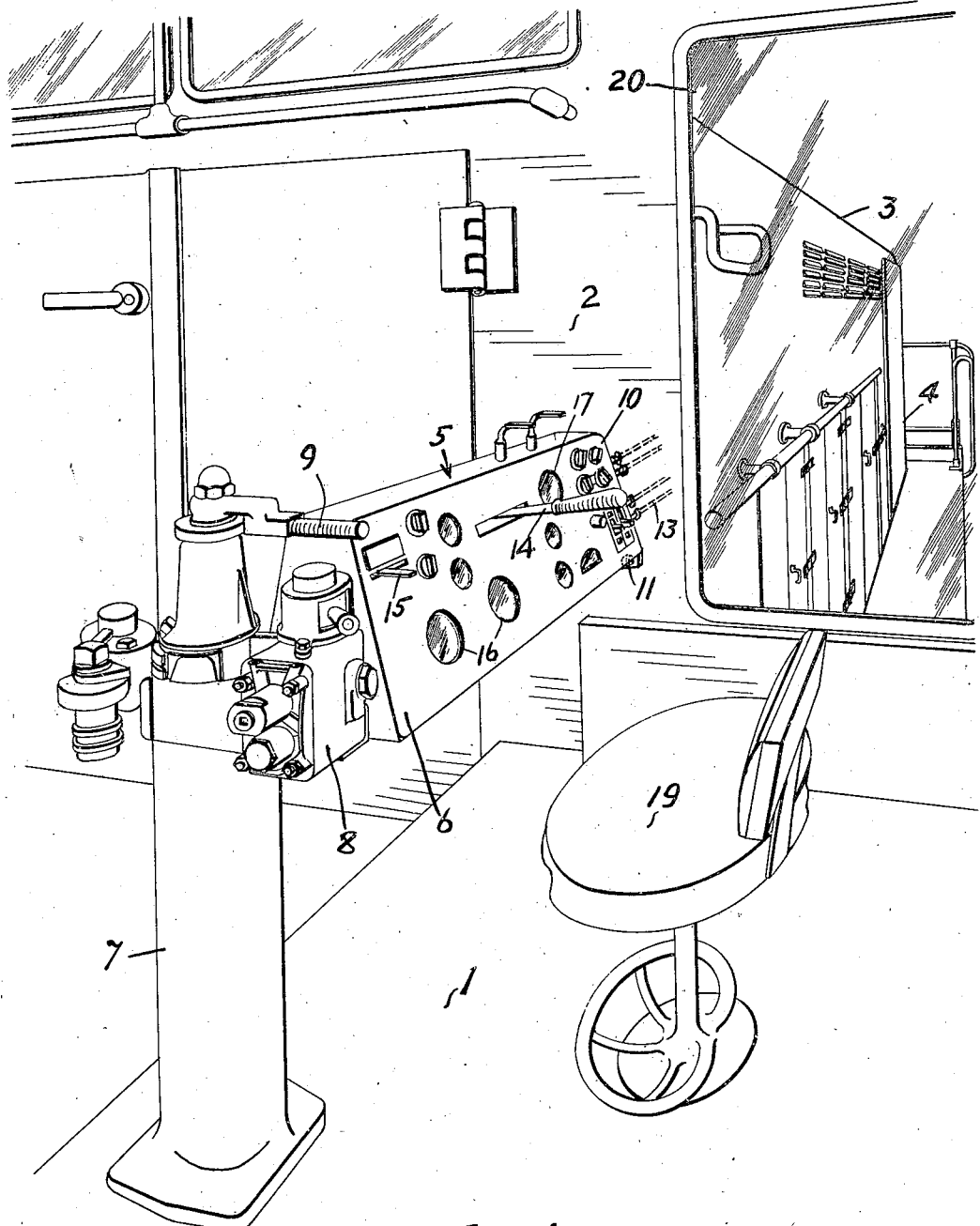
Fig. 1 is a fragmentary perspective view looking from within the cab through a window toward the front end of the locomotive along the length of the engine hook, my improved control panel being shown in the foregoing extending at right angles to the transverse cab wall.

In the particular embodiment of the invention such as disclosed herein merely for the purpose of illustrating one specific form among possible others that the invention might take in practice, I have shown an internal combustion engine type locomotive having a cab with a floor 1 and a front transverse wall 2 which in effect constitutes a rear wall of an engine hood 3 extending toward the front end 4 of the locomotive. My improved control panel is generally shown at 5 and is mounted at its rear end 6 upon suitable supporting means such as a well-known type of air brake standard 7 and brake valve mechanism generally indicated at 8 which is controlled by a usual air brake hand lever 9. The elements 7 and 8 thus have dual functions, one to support the control elements and the other to support the panel. The forward end 10 of the control panel is disposed in juxtaposition to the back wall 2 and is rigidly connected thereto by additional supporting means such as any suitable bolts, screws, or the like, diagrammatically indicated at 11. All of the usual electric wires and pipes extend through one end 10 of the control panel for connection to continuing wires and pipes diagrammatically indicated at 13. These continuing pipes and wires are then led to any of the well-known control accessories and operating devices which may be placed throughout the locomotive and hence need not be described here inasmuch as they do not constitute a part of my present invention.

Various operating elements having inter-related instrumentation and operating connections with the air brake standard and other parts of the locomotive are normally associated with the control panel and include an engine speed lever 14, reversing switch control 15, and indicating instruments 16 and 17, as well as any other desired control or indicating elements.

From the foregoing disclosure it is seen that the fundamental arrangement of my control panel consists in having a longitudinally extending box-like panel extending longitudinally of the locomotive so as to inherently present an end wall of the panel against the transverse cab wall 2 whereby any pipes or other connecting wires or the like may extend directly from the end of the control panel through the wall 2 for connection to continuing pipes and wires. Furthermore, the foregoing arrangement permits the control panel to be supported in an extremely rugged manner at each end merely by connecting one end to the sturdy air brake mechanism 7—9 and to the cab wall 2. This also produces the desirable result of having ample foot and leg room beneath the panel so that an operator may comfortably sit upon the seat 19 to operate the locomotive while easily looking through either the front cab window 20 or its usual rear window as is alternatively required in the repeated forward and reverse running of switching and yard locomotives.

It will of course be understood that various changes in details of construction and arrangement of parts may be made by those skilled in the art without departing from the spirit of the invention as set forth in the appended claims.

I claim:

1. The combination in a locomotive having a cab with a floor and a transverse cab wall and a window therein from which an operator looks forwardly from a normal operating position, a control panel comprising a substantially longitudinally extending panel structure with one end in juxtaposition to said wall so as to extend outwardly therefrom in a direction substantially longitudinally of the locomotive along one side of the operator's position, and means for supporting said panel in vertically spaced relation from the cab floor.

2. The combination in a locomotive having a transverse cab wall, a control panel comprising a substantially longitudinally extending box-like structure with one end placed in proximity to said wall so as to extend outwardly therefrom in a direction substantially longitudinally of the locomotive, and means whereby connections from the control panel to the locomotive extend longitudinally from the end of said box-like structure and thence through said transverse wall to devices operatively connected to the control panel.

3. The combination in a locomotive having a cab with a floor and a transverse cab wall with a window therein through which an operator looks forwardly from a normal operating position, a control panel comprising a substantially longitudinally extending panel structure with one end in juxtaposition to said wall so as to extend outwardly therefrom in a direction substantially longitudinally of the locomotive, and an air brake standard located at the other end of the control panel and connected thereto to support the latter.

4. The combination in a locomotive having a cab with a floor and a transverse cab wall with a window therein through which an operator looks forwardly from a normal operating position, a control panel comprising a substantially longitudinally extending panel structure with one end in juxtaposition to said wall so as to extend outwardly therefrom in a direction substantially longitudinally of the locomotive, an air brake standard at the other end of the control panel, and means for supporting said latter end of the panel by said standard while the first mentioned end is supported by the transverse wall of the cab.

5. The combination in a locomotive having a cab with a floor and a transverse cab wall provided with a window through which an operator looks forwardly from a normal operating position, a vertical operating standard having locomotive control means, said standard being disposed to one side of the operator's position and spaced longitudinally from the cab wall, a horizontally extended control panel having instrumentation and operating elements certain of which are connected to said standard and others of which are connected at one end of the panel to devices of the locomotive, and means for supporting said horizontally extending panel in vertically spaced relation to the cab floor and between the standard and wall in juxtaposition to the latter so as to extend outwardly therefrom substantially longitudinally of the locomotive on the same side of the operator's position as the standard.

DANA R. STAPLES.